United States Patent [19]

Moss

[11] Patent Number: 4,948,935
[45] Date of Patent: Aug. 14, 1990

[54] APPARATUS FOR USE WITH A CARBON ARC TORCH TO RETAIN SHORT ELECTRODES

[76] Inventor: Paul B. Moss, 202 S. Lansing, Tulsa, Okla. 74102

[21] Appl. No.: 334,161

[22] Filed: Apr. 6, 1989

[51] Int. Cl.⁵ .......................................... B23K 37/00
[52] U.S. Cl. .................................................... 219/70
[58] Field of Search ............... 219/138, 139, 140, 141, 219/142, 143, 144, 70

[56] References Cited

U.S. PATENT DOCUMENTS

| | | | |
|---|---|---|---|
| 1,326,601 | 12/1919 | Ledwinka | 219/144 |
| 2,376,943 | 5/1945 | Smith | 219/144 |
| 2,383,951 | 9/1945 | Bass | 219/138 |
| 3,387,111 | 6/1968 | Driscoll | 219/70 |
| 3,483,348 | 12/1969 | Jenkins | 219/70 |
| 4,045,649 | 8/1977 | Moss et al. | 219/143 |
| 4,150,276 | 4/1979 | Moss | 219/70 |
| 4,317,024 | 2/1982 | Moss | 219/70 |

FOREIGN PATENT DOCUMENTS 641368 5/1962 Canada .

Primary Examiner—A. D. Pellinen
Assistant Examiner—Geoffrey S. Evans
Attorney, Agent, or Firm—Head & Johnson

[57] ABSTRACT

An apparatus for carbon arc electrodes which permits the use of short length electrodes, having a body member for connection to an electrical energy source so that the body member may be manually manipulated for electric arc application purposes, and provision at the other end to removably receive a short length of electrode, the body member providing electrical continuity between the short electrode and the electrical energy source so that the short electrode may be consumed and replaced.

4 Claims, 2 Drawing Sheets

APPARATUS FOR USE WITH A CARBON ARC TORCH TO RETAIN SHORT ELECTRODES

The invention relates to a carbon electrode utilized for melting metal. When rapid cutting away of large quantities of metal is desired, a common technique is to use an air-carbon electrode arrangement in which an elongated cylindrical electrode formed of carbon is employed. An arc is achieved between the electrode and the workpiece. Air is also supplied to blow molten metal formed by the arc to increase the speed of the melting away of the metal. The process slowly consumes the carbon electrode, and it, therefore, must be repeatedly moved in the holder to advance it so that the end is in the proper relationship relative to the holder. When the electrode is reduced to a minimum length, an additional electrode must be added in a telescoping end arrangement so that the short length may be used. This telescoping connection is relatively weak and is frequently broken, leaving a short length electrode which cannot be used with the standard carbon arc holders, such as shown in the issued patents and patent applications above referenced, and it is customary to discard these short length electrodes. Since carbon electrodes are relatively expensive, their disposal constitutes a significant economic loss. The purpose of this invention is to provide a means of making utilization of short lengths of carbon electrode.

The two above-referenced issued United States patents disclose a holder for carbon arc electrodes, and the references cited against these patents show other arrangements which are known techniques for supporting carbon arc electrodes. The referenced issued patents and the patent application teach improvements in apparatus for holding electrodes, but the torches shown in the patents and the other known prior art are primarily adapted for use of relatively long lengths of carbon arc electrodes and are not useful for exceedingly short lengths of electrodes. Thus, the known prior art does not teach any practical means of using short lengths of carbon electrodes.

This invention is related to a method of using short lengths of carbon arc electrodes. Reference may be had to U.S. Pat. Nos. 4,045,649 and 4,150,276 and patent application No. 161,030, filed June 19, 1980, entitled "Adjustable Air-Carbon Arc Torch" now U.S. Pat. No. 4,317,024 for background information as to devices for removably supporting carbon arc electrodes for use in manufacturing and repairing steel products. These issued patents and applications are incorporated herein by reference.

The following are considered to be the most relevant prior art references known to the applicant: U.S. Pat. No. 2,538,245 to Hiller, issued Jan. 16, 1951; U.S. Pat. No. 3,757,283 to Kelly, issued Sept. 4, 1973; U.S. Pat. No. 4,045,649 to Moss et al, issued Aug. 30, 1977; U.S. Pat. No. 4,150,276 to Moss, issued Apr. 17, 1979; U.S. Pat. No. 4,761,531 to Moss, issued May 2, 1988; and Canadian Pat. No. 641,368 to Hugo, issued May 15, 1962.

SUMMARY OF THE INVENTION

An apparatus for use in making it possible for the user of carbon arc electrodes to efficiently consume a much higher percent of the length of a typical carbon arc electrode utilized in industry for melting away metal with the arc process is the subject of this disclosure. A holder for an electrode is provided in the form of a body member which has means at the rearward end thereof for connection to an electrical energy source which may be in the form of a type of normal carbon arc electrode holder. The body member forward end has means for removably receiving a short length of electrode so that the short length may be consumed in performance of work to thereby eliminate the waste which is experienced in the discard of short lengths of carbon arc electrodes. The body member may be in a variety of forms which facilitate the expeditious replacement of a consumed electrode with a subsequent short length electrode.

DESCRIPTION OF THE PREFERRED EMBODIMENT

Figures 1, 2:
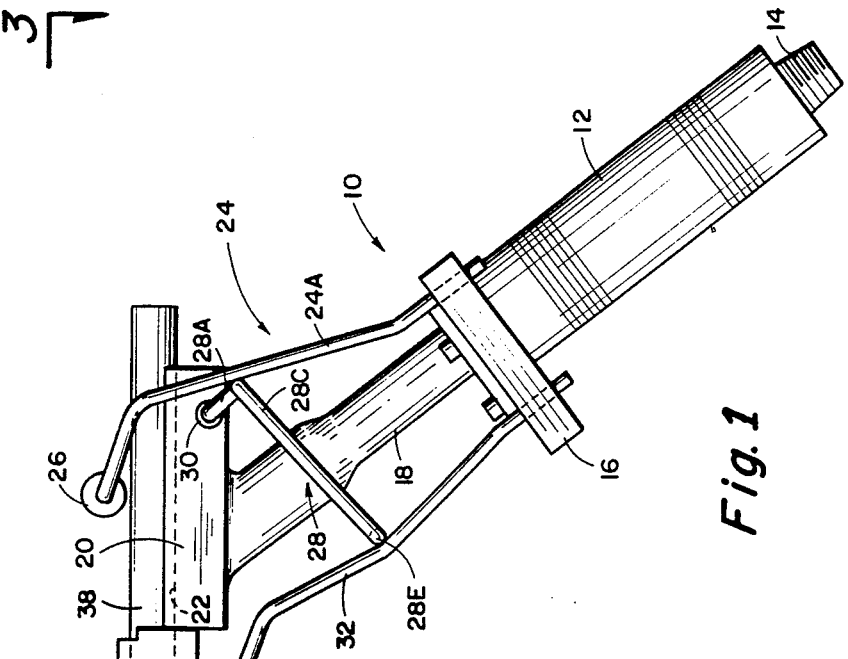
FIG. 1 is a side view of an electrode holder or torch, by which a carbon arc electrode may be held for use in melting away metal showing one embodiment of a means of holding a short length of electrode.
FIG. 2 is a partial view as in FIG. 1 showing the upper portion of the electrode holder and showing the holder in the clamped position and in addition showing an alternate device for use in employing short lengths of electrodes.
Figure 3:
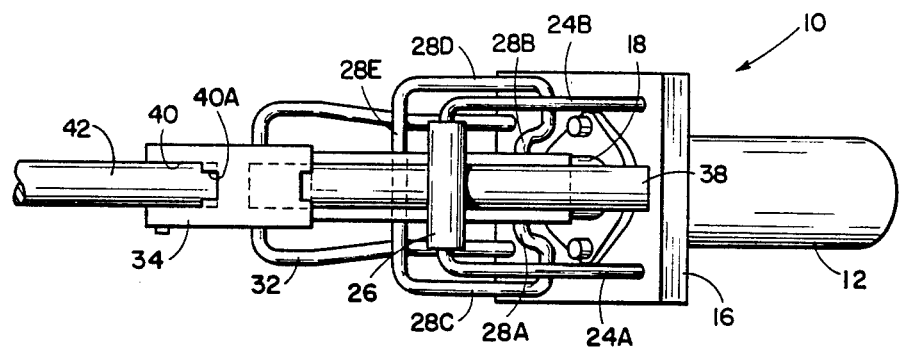
FIG. 3 is a top view of the embodiment of the invention shown in FIG. 1 and showing more details of the electrode holder and of the apparatus for supporting short lengths of electrodes.
Figure 6:
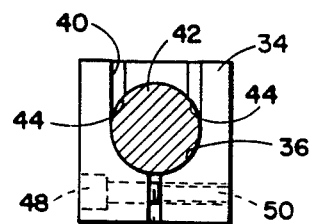
FIG. 6 is a cross-sectional view taken along the line 6—6 of FIG. 1 showing an end view of the electrode holder.

Referring first to FIGS. 1, 3, and 6, an embodiment of an improved torch and holder for short lengths of electrodes is shown. The torch is generally indicated by the numeral 10 and includes a handle portion 12 configured to fit the hand of the user so that the electrode may be properly moved about in position for performing a metal melting operation. At the lower end 14 means is provided whereby the torch may be connected to an electrical potential and also to provide air pressure. In the usual operation, one pole of an electrical source is connected to the torch and the other pole is connected to the work piece so that an arc is struck between an electrode held by the torch and the work piece to perform the work of melting metal.

At the upper end of the handle portion 12 is a block 16 formed of non-electrically conductive material, such as plastic. Extending from the block 16 is the torch body portion 18 formed of conductive material such as copper or copper alloy. At the other end of the body portion 18 is an electrode support 20 which has an upper surface 22 preferably of V-shaped cross-section configuration to receive an electrode thereon. Reference may be had to the referenced issued patents and applications for more details as to the typical configuration of elements 10 through 22.

The function of torch 10 is to hold an electrode in engagement with the support upper surface 22. For this purpose a U-shaped bail formed of leg portions 24A and 24B extends from block 16. Each bail leg 24A and 24B is bent at 90° at the outer end and receives between the two outer ends an electrode engagement member 26 which is preferably, as illustrated, cylindrical. The bail 24 is biased to apply downward pressure of the electrode engagement member 26 towards electrode support 20 so that an electrode positioned therebetween is held in place.

In order to facilitate removal of, or reposition of, an electrode or to permit the insertion of a new electrode, a lever generally indicated by numeral 28 is employed. The lever is also of U-shaped configuration and the opposed ends thereof 28A and 28B are received in electrode support 20. To electrically insulate bail 28 from support 20, insulating bushings 30 are utilized.

Lever 28 has opposed legs 28C and 28D with the bottom portion 28E of the U connecting the legs. In the attitude shown in FIG. 1, the lever is in engagement with the bail 24A and 24B and has deflected the bail 24 upwardly so that electrode engagement member 26 is moved away from support surface 22. With the lever moved in the opposite direction to the position shown in FIG. 2, no contact is made between the lever 28 and bail 24, and force is applied by the electrode engagement member 26 towards surface 22 of the electrode support.

To protect the torch body portion 18 and electrode support 20 from inadvertent engagement with a grounded conductive item, a protector member 32 is employed. The member 32 is in the form of a U-shaped length of wire which extends forwardly of the torch body 18 from insulated block 16. The member 32 may be formed of a stiff metal wire as illustrated, and of a U-shaped arrangement.

When utilizing torch 10 in the normal manner, a relatively long length of carbon arc electrode, such as approximately 12" or longer, is supported between the electrode surface support 22 and engagement member 26. The electrode is positioned so that the forward end is at the correct spacing from support 20 for proper use by the operator. It can be seen that when the length of the electrode reaches a minimum length, which may be four or five inches, insufficient length is provided so that it can be securely engaged by the torch and yet permit the forward end to extend beyond the electrode support sufficient for its use. Such short length electrode must in the present practice in the industry, be discarded. FIGS. 1, 3 and 6 show an embodiment of a device which makes use of the short length electrodes. A holder generally indicated by 34 is employed. The holder of this first embodiment may be formed of a conductive material, such as copper or copper alloy, and is of generally rectangular configuration having an opening 36 through it. Received in the opening 36 and extending rearwardly from the holder 34 is a short length of cylindrical conductive member 38. The diameter of the conductive member 38 is that of a normal carbon arc electrode for which the torch 10 is designed to handle so that the conductive cylindrical member 38 is received by the torch in the same way that a typical carbon arc electrode is received. The forward end of the conductive cylinder 38 is secured to holder 34 such as by silver soldering it into a portion of the opening 36.

The forward end of holder 34 has an opening 40 at the top so that in cross-section, as shown in FIG. 6, it provides a generally U-shaped configuration. In this manner, the end of a short length of electrode 42 may be positioned within the opening 40 in housing 34. The electrode can then be consumed down to an exceedingly short length, much shorter than would normally be usable with torch 10. As shown in FIGS. 3 and 6, the width of slot 40 may be reduced at the rearward portion 40A forming a slight lip area 44. This aids in inserting the electrode 42 in position in the slot since the rearward end of the electrode may be pushed under the lip area 44 and then the electrode moved downwardly so that it is in the position illustrated in FIG. 1 where it is in axial alignment with the conductive cylindrical member 38.

The forward bottom portion of holder 34 is provided with a slit 46 as seen in FIG. 6. A bolt 48 extends through one-half of the bottom portion of the holder and into threaded opening 50 in the other half. In this manner the width of the slot 40 may be varied to ensure firm and secure fitting of an electrode 42 placed in the holder.

Figure 5:
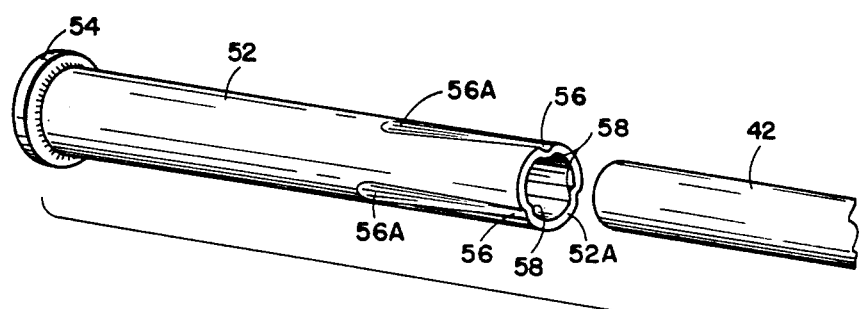
FIG. 5 is an isometric view of the embodiment of the invention for supporting short lengths of electrodes as shown in FIG. 2.

FIGS. 2 and 5 show an alternate embodiment of the invention in which the stub holder is in the shape of a tubular member 52. The rearward end of the tubular member 52 is provided with an external integral flange 54, the purpose of which is to aid in the longitudinal positioning of the member in the torch. At the forward end of member 52 are spaced apart inward ribs 56, three being shown. The ribs are deeper at their rearward ends 56A. The dimension of the member 52 is selected such that the electrode 42 will slip into the open forward end 52A of the member. The electrode 42 is engaged by the inwardly projecting ribs 58. Since the depth of the ribs increase in a direction towards the rearward end of the member 52, the electrode 42 may be pushed into the member until it is securely held in position. Member 52 then is utilized in the torch 10 in the same manner as a typical electrode. The diameter of the member 52 will be slightly greater than that of the electrode 42 by the typical torch, such as illustrated in FIGS. 1 and 3, is adaptable to accept electrodes over a given range, and, therefore, the holder in the shape of the tubular member 52 may be employed in conjunction with a torch of the type illustrated for making use of small lengths of electrodes 42.

Figure 4:
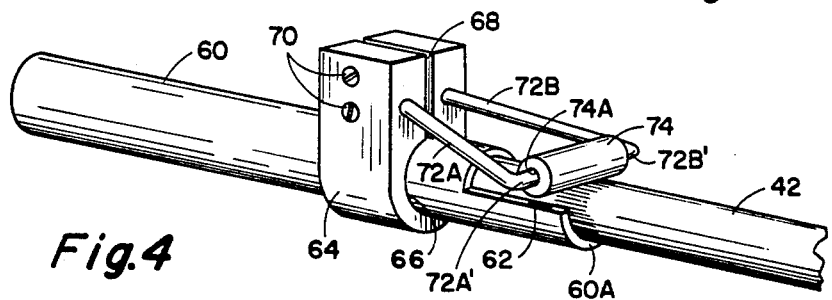
FIG. 4 is an isometric view of another alternate embodiment of the device for use with a torch for supporting short lengths of electrodes.

A third embodiment of the invention is illustrated in FIG. 4. It includes a cylindrical portion 60 which is tubular at least at its forward end. The member 60 is of conductive material and is positioned in a torch in the same manner that the embodiment of FIG. 1 is utilized. The upper portion of the tubular forward end 60A of the member is cut away for a short length at 62. An electrode 42 may then be positioned in the tubular end 60A and the upper surface of the end of electrode will be exposed as illustrated.

A retainer body 64, which may be either of conductive or non-conductive material, has an opening 66 therein to receive the cylindrical member 60 just rearwardly of the cut-away portions 62. The body 64 has slot 68 formed in the upper end thereof communicating with the opening 66. Bolts 70 extend through the body from one side to the other and into a threaded opneing in the opposite side of the body (not seen) so that the body may be clamped onto the cylindrical member 60. Extending from the forward end of body 64 are a pair of torsion arms 72A and 72B. The outer end of the arms are bent at 72A' and 72B' and extend in axial alignment towards each other. An electrode engagement member 74 has an axial opening 74A therethrough which receives the opposed torsion arm end portion 72A' and 72B'. Arms 72A and 72B are of flexible metal and are bent such as to be biased resiliently downwardly at the outer ends so that retention force is applied by engagement member 74 against the electrode 42. When the electrode 42 is burnt down to near the forward end 60A of the cylindrical member, it can be easily removed and replaced by a new length of electrode. It can be seen that the length of electrode required to be supported in the holder of FIG. 4 is substantially less than that which is required in a torch 10, thereby allowing short lengths of electrode to be effectively utilized.

The invention provides an improved torch and a holder for short lengths of electrodes which may be used with the torch or with similar torches to eliminate the substantial waste in the use of electrodes which occur at the present time with known types of electrode torches.

While the invention has been described with a certain degree of particularity, it is manifest that many changes may be made in the details of construction and the arrangement of components without departing from the spirit and scope of this disclosure. It is understood that the invention is not limited to the exemplified embodiments set forth herein but it is to be limited only by the scope of the attached claim or claims, including the full range of equivalency to which each element thereof is entitled.

I claim:

1. An apparatus for use in a carbon arc torch to permit the torch to retain a short length cylindrical electrode, such as a carbon arc electrode, comprising:

a holder having a first and second end and having an elongated open top trough in one end, the trough being configured to receive and retain a portion of the length of a cylindrical electrode thereon; and an elongated cylindrical member extending from said holder other end dimensioned as a cylindrical electrode and receivable in a torch constructed to receive a cylindrical electrode therein, whereby the apparatus can be utilized with a standard carbon arc torch without modification of the torch and can retain short length electrodes which are otherwise too short for use with a standard torch.

2. An apparatus according to claim 1 including:

means extending from the holder for removably securing a cylindrical electrode, said means including a pair of spaced apart flexible metal bars each having an inner end and an outer end and having their inner ends secured to said holder, the flexible bars being generally parallel to and above said open top trough; and a cross-member extending between said outer end of each said bar member, the cross-member being thereby spaced above said open top trough, one end of a cylindrical electrode being removably receivable between the trough surface and the cross-member.

3. An apparatus according to claim 1 wherein said open top trough end of said holder is defined in part by a U-shaped recess of width dimensioned to slidable receive a cylindrical electrode therein.

4. An apparatus according to claim 3 wherein said portion having said U-shaped recess therein is split and including a threaded bolt extending transversely through said slit providing means of threadably adjusting the width of said U-shaped recess.

* * * * *